United States Patent [19]

Jacobsen

[11] Patent Number: 4,832,557
[45] Date of Patent: May 23, 1989

[54] GROUND-IMPLANTABLE PLASTIC FASTENER FOR HOLDING EROSION CLOTH ON THE GROUND

[76] Inventor: William M. Jacobsen, P.O. Box 241, Palm City, Fla. 33490

[21] Appl. No.: 940,399

[22] Filed: Dec. 11, 1986

[51] Int. Cl.⁴ .............................. F16B 15/02; F02B 3/12
[52] U.S. Cl. ..................................... 411/485; 411/470; 411/446; 411/908; 405/19
[58] Field of Search ............... 411/443, 446, 447, 461, 411/477, 488, 485, 920, 908, 442, 457, 470; 52/155, 102; 405/15–20

[56] References Cited

U.S. PATENT DOCUMENTS

| | | | |
|---|---|---|---|
| 2,771 | 9/1842 | Buckelew | 411/447 |
| 147,343 | 2/1874 | Miles | 411/470 |
| 202,179 | 4/1878 | Lennon | 52/155 |
| 324,310 | 8/1885 | Dunn et al. | 411/485 |
| 916,153 | 3/1909 | Hoff | 411/470 |
| 2,314,481 | 3/1943 | Crooks | 411/485 |
| 2,457,454 | 12/1948 | Dunlap | 411/447 |
| 3,395,625 | 8/1968 | Blanchette et al. | 411/908 |

FOREIGN PATENT DOCUMENTS 753844  3/1967  Canada ..................... 411/485

*Primary Examiner*—Neill Wilson
*Attorney, Agent, or Firm*—Oltman and Flynn

[57] ABSTRACT

An implantable polycarbonate fastener for holding erosion cloth on the ground. The fastener has a long vertical leg, a shorter vertical leg extending parallel to the long leg, and a horizontal top leg extending between them. The long vertical leg has a tapered lower end segment with a downwardly and outwardly inclined inside face to cause the long leg to bend away from the shorter vertical leg as it is driven down into the ground, thereby making the implanted fastener harder to pull out of the ground.

4 Claims, 4 Drawing Sheets

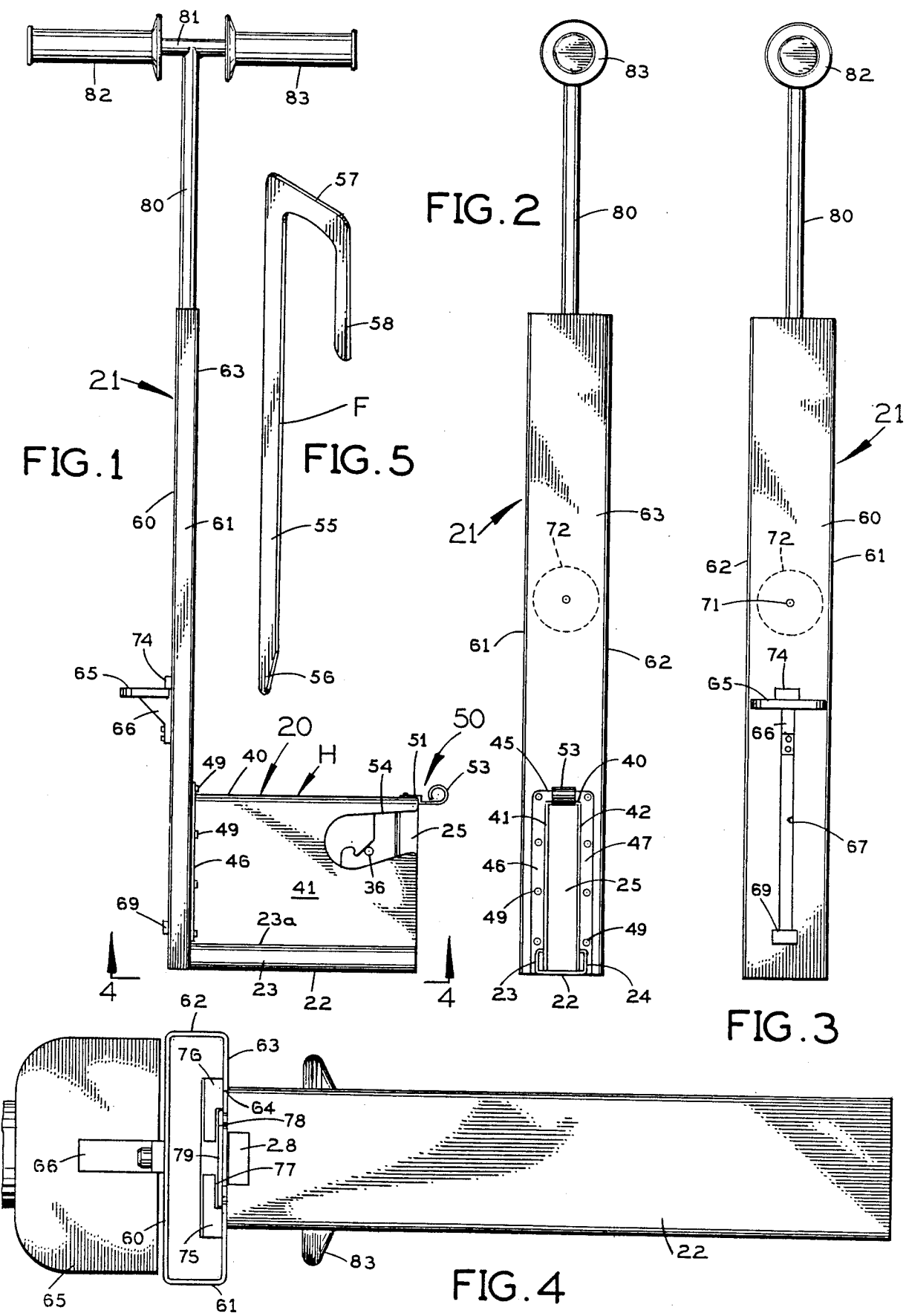

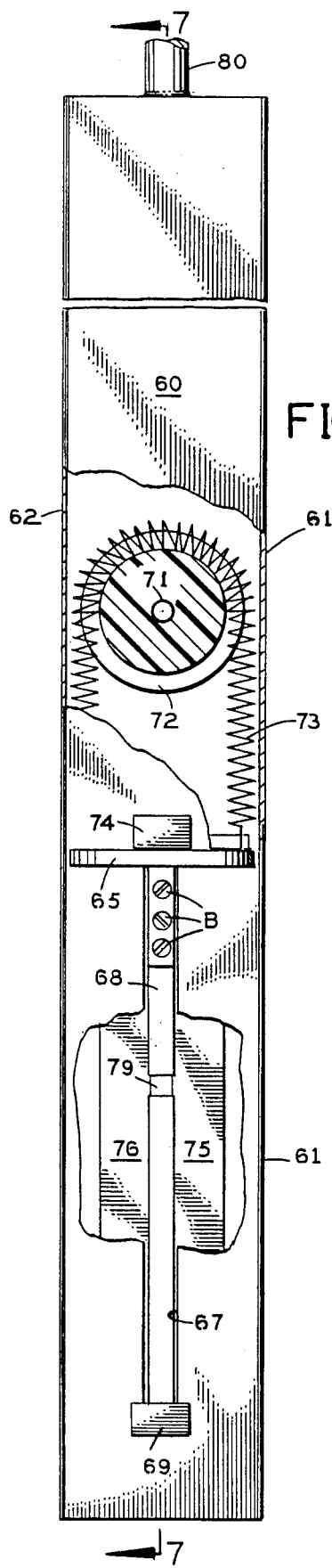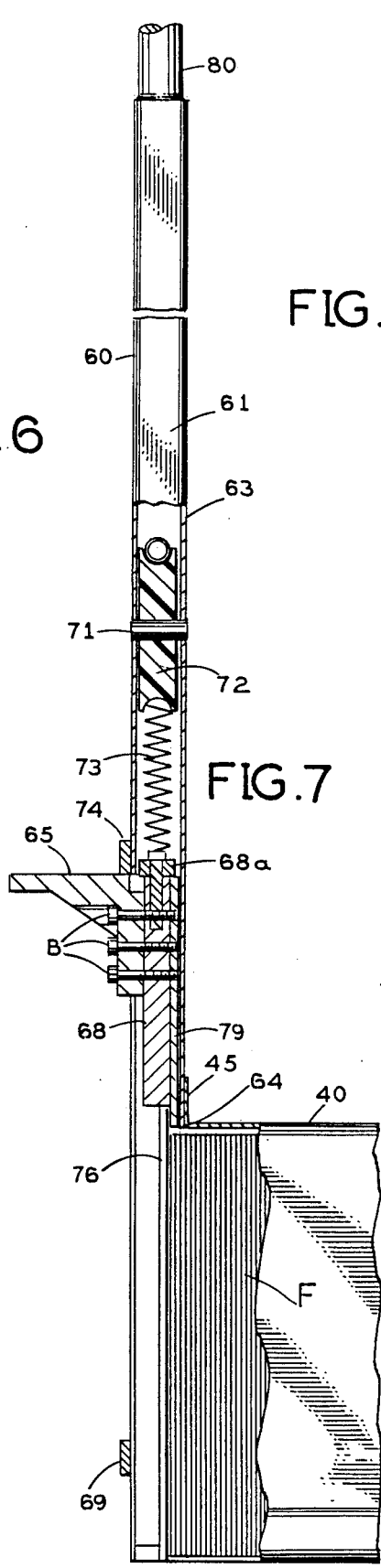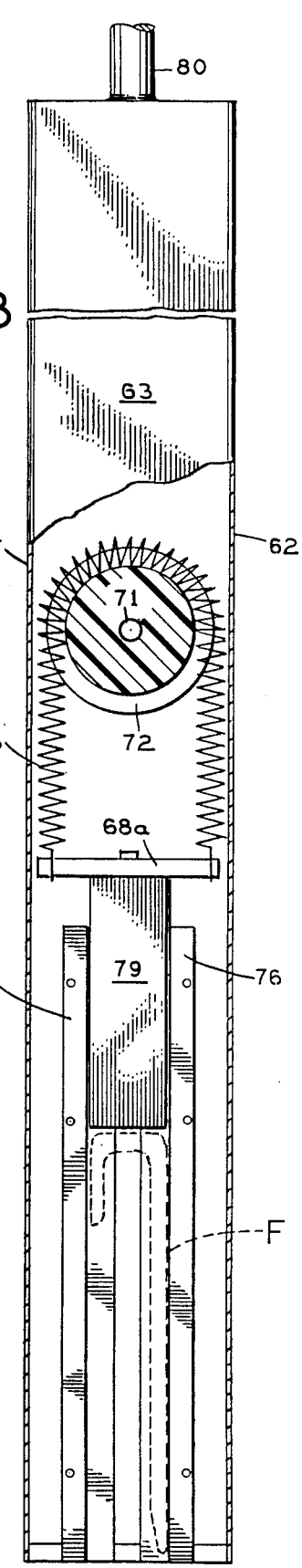

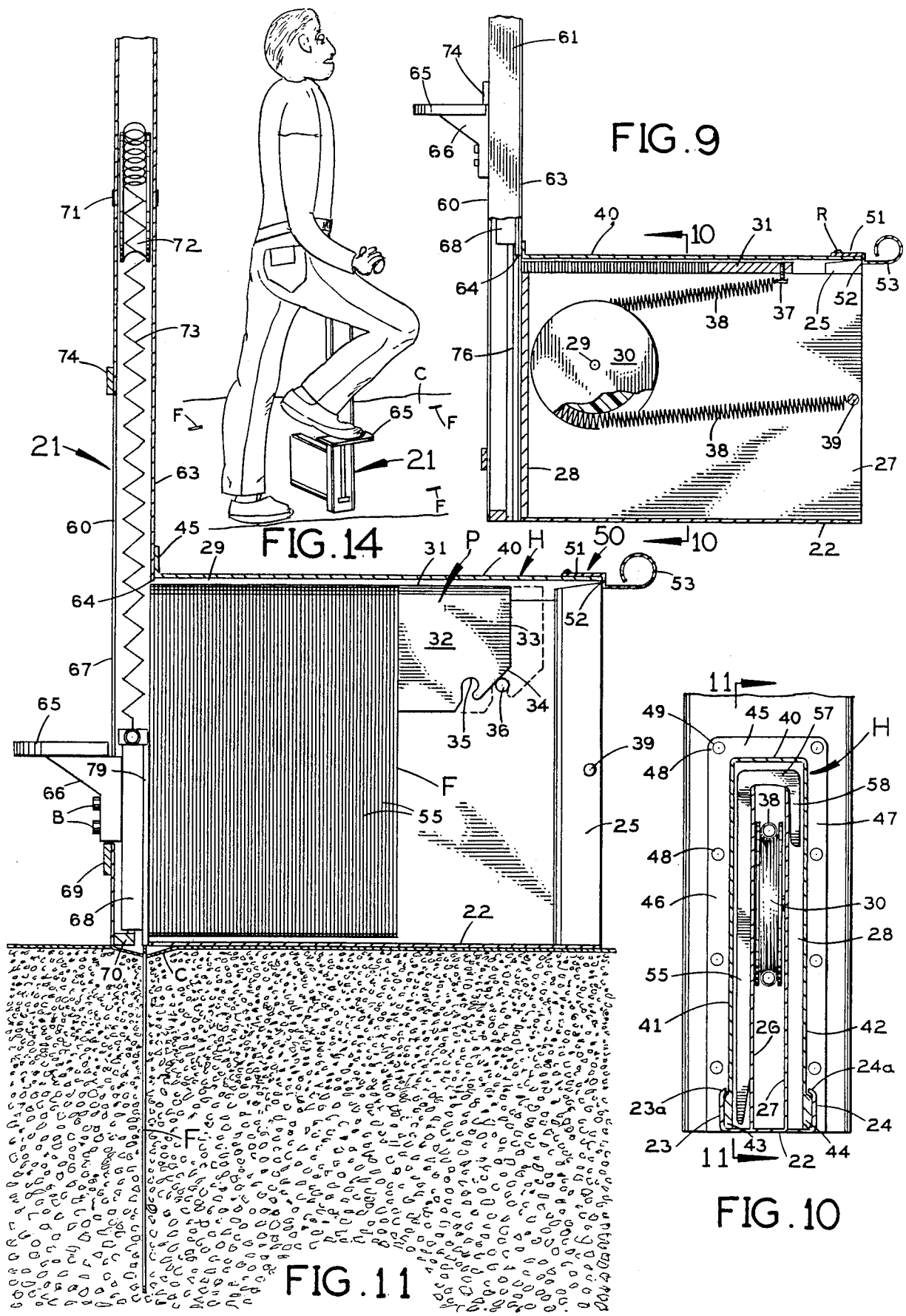

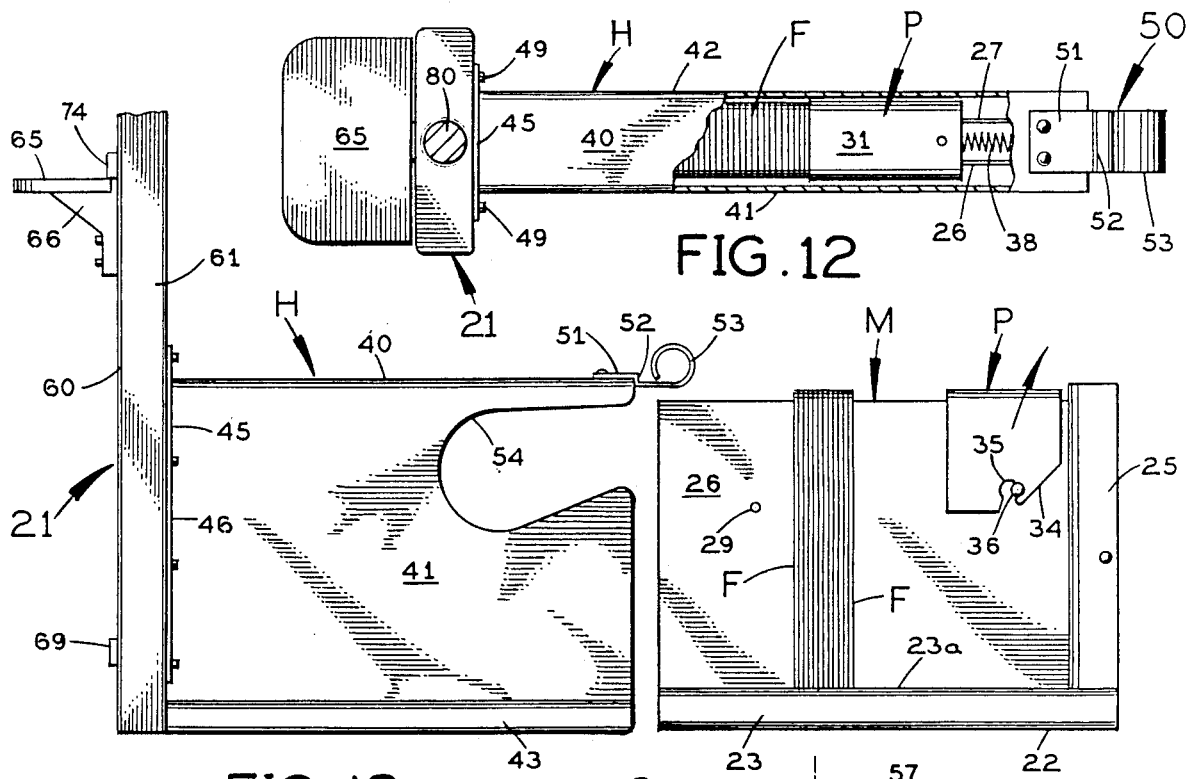
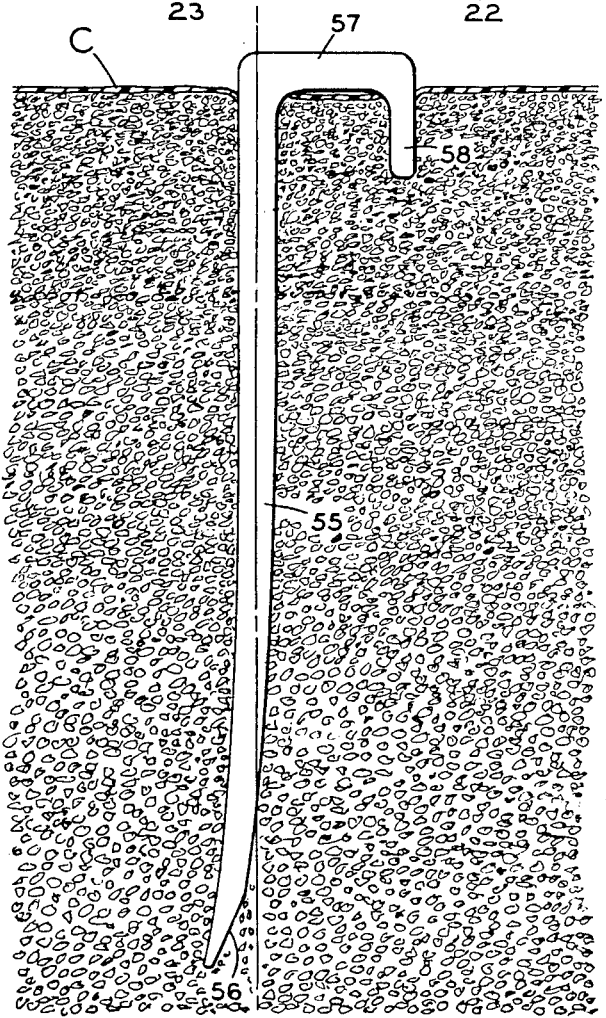

GROUND-IMPLANTABLE PLASTIC FASTENER FOR HOLDING EROSION CLOTH ON THE GROUND

SUMMARY OF THE INVENTION

This invention relates to a fastener for implantation down through a cover on the ground, particularly a fabric cover for grass seedlings on sloping ground.

A common practice is to lay erosion cloth over grass seedlings, particularly on sloping ground bordering roads and at highway interchanges. The erosion cloth is a fabric cloth designed to hold seeds in the ground and to hold in place mulch products that cover seed in the ground to foster seed germination and growth of seedling roots through the top layer of soil. The erosion cloth must be fastened in place in the ground so that it will not be displaced from the desired location by rain, water runoff or wind. The erosion cloth may be of closely woven fabric comparable to that of a man's shirt, or it may be of widely separated strands providing one inch square openings, or it may be anywhere between these extremes.

To hold the erosion cloth in place, the usual practice has been to use a hammer which drives hand held metal staples down through the erosion cloth and into the ground.

The present invention is a fastener which is especially adapted for use with a foot-operated implanting machine as disclosed and claimed in copending U.S. patent application Ser. No. 06/834,426, filed Feb. 2, 1986, which is assigned to me.

A principal object of this invention is to provide a novel fastener for implantation in the ground down through erosion cloth on the ground.

Another object of this invention is to provide a novel ground-implanted fastener which is surprisingly difficult to remove from the soil in which it is implanted.

Further objects and advantages of this invention will be apparent from the following detailed description of a presently preferred embodiment which is illustrated schematically in the accompanying drawings.

DESCRIPTION OF THE DRAWINGS

FIG. 1 is a side elevation of a foot-operated machine which may be used to implant the fastener of this invention in the ground;

FIG. 2 is a rear elevation of this machine;

FIG. 3 is a front elevation;

FIG. 4 is a bottom plan view, taken from the line 4—4 in FIG. 1;

FIG. 5 is a perspective view of a fastener in accordance with the present invention;

FIG. 6 is an enlarged view taken from the front and showing the lower two-thirds of the machine partly in elevation and partly broken away to expose working parts;

FIG. 7 is a vertical section taken along the line 7—7 in FIG. 6;

FIG. 8 is a view similar to FIG. 6 with more parts broken away to expose additional working parts of the machine and showing in phantom the fastener of the present invention;

FIG. 9 is a side view of the lower part of the machine with the housing broken away to show the fastener magazine;

FIG. 10 is a vertical cross-section taken along the line 10—10 in FIG. 9;

FIG. 11 is a longitudinal section taken along the line 11—11 in FIG. 10 at one side of the fasteners in the magazine;

FIG. 12 is a top plan view of the FIG. 1 machine with parts broken away for clarity;

FIG. 13 is a side elevation of this machine with its fastener magazine taken apart;

FIG. 14 shows a man operating the machine to implant the fastener of the present invention down through erosion cloth and into the ground; and FIG. 15 shows the fastener implanated in the ground.

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

DETAILED DESCRIPTION

Referring to FIGS. 1 and 2, the implanting machine shown there has a magazine assembly 20 at the bottom and a vertical column 21 extending up in front of the magazine assembly and rigidly attached to it.

Referring to FIGS. 10 and 13, the magazine assembly includes a magazine M (FIG. 13) having a bottom piece presenting a flat bottom wall 22 and vertical flanges 23 and 24 (FIG. 10) extending up from the bottom wall on opposite sides and terminating at their upper ends in respective inturned lips 23a and 24a. At the back end of the magazine (i.e., the end remote from the upstanding column 21) a rigid end piece structure 25 (FIG. 13) extends vertically up from the bottom wall 22. There is a slight clearance between each inturned lip 23a and 24a of the bottom piece and the adjacent side of the end piece structure 25.

The magazine has a pair of flat vertical sides 26 and 27 (FIG. 10) which extend up from its bottom wall 22 along the entire length of the magazine from the back end piece structure 25 to its opposite front end. An upstanding front end wall 28 (FIG. 9) extends between and is joined to the sides 26 and 27 of the magazine at its front end. Both sides 26 and 27 have a substantial clearance inward from the inturned lips 23a and 24a of the magazine's bottom piece. Toward the front end of the magazine its sides 26 and 27 rotatably support the horizontal axle 29 of a pulley 30.

A follower P of generally channel-shaped cross-section is slidably mounted on the horizontally disposed top edges of the sides 26 and 27 of the magazine. As shown in FIG. 11, this follower has a horizontal top wall 31, a depending side wall 32 extending down from top wall 31 outside the adjacent side 26 of the magazine, and a similar opposite side wall (not shown) which extends down from top wall 31 outside the adjacent side 27 of the magazine. The side wall 32 of the follower has a vertical back edge 33 extending down from its top wall 31, and a downwardly and forwardly inclined edge 34 extending from the lower end of its back edge and leading to a downwardly-facing rounded notch 35. The opposite side wall of the follower is a mirror image of side wall 32, with a notch similar to notch 35. Toward the back end of the magazine a cross pin 36 extends between its opposite sides 26 and 27 and projects outward past each of them for reception in the notch 35 in side wall 32 of the follower and the corresponding notch in the opposite side wall of the follower. When these notches in the follower engage cross pin 36, as shown in phantom in FIG. 11, the follower P is held in its fully retracted position rearward along the magazine.

As shown in FIG. 9, a spring-anchoring screw 37 extends down from the top wall 31 of follower P at its back end midway between its depending opposite sides, such as side 32. A helically wound tension spring 38 is anchored at its upper end on screw 37 and extends forward from it between the opposite sides 26 and 27 of the magazine, around the front of the pulley 30, and from beneath this pulley back to a lower anchor provided by cross pin 39, which is carried by the back end piece structure 25 of the magazine, as indicated in FIG. 11. This spring urges the follower P forward (i.e., to the left in FIGS. 9 and 11) along the top of the magazine.

The magazine is slidably engageable with a three-sided rectangular magazine housing H (FIGS. 12 and 13) having a flat horizontal top wall 40 and opposite vertical side walls 41 and 42 extending down from the top wall. The housing side wall 41 is spaced outward from the corresponding side 26 of the magazine, as shown in FIG. 10, and the other housing side wall 42 is similarly spaced outward from the corresponding side 27 of the magazine. The lower end of the housing side wall 41 passes with a slight clearance inside the inturned lip 23a on the bottom piece of the magazine. Similarly, the lower end of the housing side wall 42 passes down inside the inturned lip 24a on the bottom piece of the magazine. A vertically short, horizontally elongated plate 43 of rectangular cross-section is rigidly attached to the outside of the housing side wall 41 just above its bottom edge. This plate is slidably received between the bottom wall 22 and the inturned lip 23a at the inside of the upstanding flange 23 on the bottom piece of the magazine. Similarly, an identical plate 44 on the outside of the other housing side wall 42 is slidably received between the bottom wall 22 and the inturned lip 24a just inside the upstanding flange 24 on the bottom piece of the magazine. With this arrangement, the housing and the magazine can be slidably assembled together (FIG. 1) or slidably separated from one another (FIG. 13) when the user wants unobstructed access to the magazine, such as for inserting fasteners in the magazine.

At its front end the magazine housing has a flat transverse peripheral flange with a top segment 45 (FIG. 10) and downwardly extending opposite side segments 46 and 47 which are joined respectively to the top wall 40 and the side walls 41 and 42 of the housing. The front end flange on the housing is formed with holes 48 for receiving bolts 49 for attaching the magazine housing H to the back of the vertical column 21.

At its back end the magazine housing H carries a latch 50 (FIGS. 11 and 12), preferably of spring steel. This latch has a flat front segment 51 overlying the top wall 40 of the magazine housing and attached to it by rivets R, bolts or other suitable fasteners. The front segment 51 is joined to a short downwardly extending segment 52 which, as shown in FIGS. 9 and 11, engages the back face of the back end structure 25 of the magazine at the top when the magazine is fully inserted in the magazine housing. A looped handle segment 53 of the latch extends rearward from the lower end of its vertical segment 52.

Whenever the user wants to remove the magazine from the magazine housing, he lifts up the handle 53 until the vertical segment 52 of the spring latch is disengaged from the back end structure 25 of the magazine and is above it. This releases the latching engagement between the magazine housing H and the magazine M, enabling the magazine to be slid rearward out of its housing to the position shown in FIG. 13.

As shown in FIGS. 1 and 13, the magazine housing has an opening 54 in each side extending forward from its back end. Each of these openings enables the user to reach in and engage the follower P to release it from the cross pin 36 on the magazine.

FIG. 5 shows the fastener F of the present invention which may be used in the machine shown in the other Figures. This fastener has a thin, elongated vertical leg 55. The upper end of the vertical leg 55 is joined to one end of a horizontal top segment 57. A shorter second vertical leg 58 extends down from the opposite end of the top segment 57, parallel to the long vertical leg 55. The longer vertical leg 55 has a tapered lower end segment 56 whose inside face (i.e., the face toward the shorter vertical leg 58) is inclined downward and outward (i.e., away from the shorter leg 58). Both vertical legs 55 and 58 have rounded bottom corners to facilitate their penetration into the ground. The entire fastener is relatively thin but substantially rigid, with opposite flat major faces. However, because of its length the longer vertical leg 55 is more easily bent than the shorter vertical leg 58. Many of these fasteners can be glued together face-to-face for ease of handling but the glue is not strong enough to prevent the separation of the forward-most fastener from the ones behind it when the machine is operated to drive the forward-most fastener down into the ground.

In accordance with the present invention, the fastener is of suitable plastic material, preferably a high impact polycarbonate sold under the name "Lexan" by Dupont. Preferably, the longer vertical leg 55 has a length of 5¾ inches below the top segment 57, the top segment 57 has a width of 1⅛ inches between its opposite side edges, the shorter vertical leg 58 has a length of ½ inch below the top segment 57, and the thickness of the fastener between its opposite major faces is ⅛ inch. The lower end of the longer vertical leg 55 is tapered for a distance of slightly more than ½ inch along its inner face, i.e., the face toward the shorter vertical leg 58.

I have discovered that this plastic fastener is more easily driven into compacted clay soil but is much more difficult to pull out, once implanted, than a steel fastener of the same shape and size.

FIG. 15 shows the fastener after it has been implanted in the ground, penetrating the erosion cloth C on the ground. As shown in this Figure, the fastener's longer leg 55 becomes bent slightly away from the shorter leg 58. The inclined inside face on the tapered lower end segment 56 of the longer leg 55 causes a horizontal component of force, due to soil's resistance to penetration, to be applied against the lower end of this leg so that this leg bends outward as shown in full lines in this Figure from the vertical, shown by the dashed line. The more compacted the soil, the greater will be the bending of the longer vertical leg 55 of the present fastener as it goes down into the soil Because of this bending of its longer vertical leg 55 the implanted fastener more effectively resists being pulled out of the ground. For example, in highly compacted clay soil, the plastic fastener of the present invention requires about twice as much upward force to remove from the ground as a steel fastener of the same shape and size.

If either vertical leg 55 or 58 strikes a rock while being driven into the ground, that leg will break at its lower end without causing the fastener to bend out of shape.

The top segment 57 of the fastener breaks easily if struck by the blade of a power mower and does not damage the mower blade.

Another advantage of the plastic fastener is that it does not rust in storage. Therefore, it will separate properly from the fastener behind it in the magazine when it is driven into the ground.

To load the fasteners in the magazine the magazine is removed from its housing (FIG. 13) and the glued together assembly of fasteners is slid onto the magazine from its front end. The follower P at this time is locked in its retracted position by the engagement of its notches 35 with the cross pin 36 on the magazine. This stretches the tension spring 38. As shown in FIG. 10, the spacing between the long and short vertical legs 55 and 58 of each fastener is just slightly greater than the spacing between the outer faces of the sides 26 and 27 of the magazine, so that the fasteners fit snugly but slidably over the top of the magazine. The longer vertical leg 55 of each fastener extends down almost to the bottom wall 22 of the magazine.

After the magazine has been loaded with fasteners it is slid forward (to the left in FIG. 13) into its housing H until the spring latch 50 on the housing snaps down behind the back end structure 25 of the magazine, as shown in FIG. 11. This locks the magazine inside the housing.

The user now can reach in through the housing opening 54 to lift the follower P up off the cross pin 36, so that the follower now exerts a forward push on the fasteners (due to the tension spring 38) and the follower can move forward as successive fasteners are driven into the ground.

The vertical column 21 in front of the magazine assembly is of hollow rectangular cross-section (FIG. 4), presenting a flat vertical front wall 60, flat vertical opposite side walls 61 and 62, and a flat vertical back wall 63 to which the front end flange 45, 46, 47 of the magazine housing H is bolted. Inside this flange the back wall 63 of the column has a rectangular, vertically elongated opening 64 (FIGS. 4 and 11) which is large enough to pass the fasteners F from the magazine into the hollow interior of the vertical column 21.

At the front of the vertical column 21, a foot pedal 65 (FIGS. 1 and 3) is rigidly attached to the top of a slide 66, which is slidably received in a vertically extending slot 67 in the front wall 60 of the column. The width of the slot 67 is just slightly greater than that of the slide 66 so that the slide is substantially limited to vertical movement along the slot. The slide 66 is rigidly welded to or formed integral with a vertically reciprocable member 68 (FIG. 11) disposed in the hollow interior of column 21. A plate 69 welded to the front wall 60 of the column at the lower end of slot 67 and a bottom piece 70 on the inside of the front wall of the column provide downward limit stops for the slide 66 and the vertically reciprocable member 68, respectively.

Several inches above the upper end of slot 67 in the front wall 60 of vertical column 21, a cross pin 71 (FIGS. 2, 3 and 11) extends between and is rigidly supported by the front and back walls 60 and 63 of the column. A grooved pulley 72 is rotatably mounted on this cross pin. A helically wound spring 73 extends over the top of pulley 72 (FIG. 6) and has its opposite ends connected to the top piece 68a of reciprocable member 68, as shown in FIG. 7. This spring is under tension and it biases the unitary assembly of reciprocable member 68, slide 66 and foot pedal 65 upward. In this position the foot pedal 65 abuts against a plate 74 welded to the front wall 60 of the housing at the upper end of slot 67, so that plate 74 acts as an upper limit stop.

When the user places a foot on top of the foot pedal 65 and pushes down, the unitary assembly of reciprocable member 68, slide 66 and the foot pedal is moved down, overcoming the upward bias exerted by spring 73.

As shown in FIG. 4, two guide pieces 75 and 76 of generally L-shaped cross-section are rigidly attached to the inside face of back wall 63 of vertical column 21. These guide pieces extend on opposite sides of the opening 64 in back wall 63 for the full height of that opening. In its side toward the magazine assembly, guide piece 75 presents a shallow flat recess 77 which is of uniform width and depth for the entire height of this guide piece. Similarly, the other guide piece 76 has a recess 78 whose bottom face lies in the same vertical plane as that of the bottom face of recess 77. Both recesses 77 and 78 are open along the neighboring sides of the guide pieces 75 and 76. The vertical plane of the bottom faces of recesses 77 and 78 is spaced from the inside face of the back wall 63 of column 21 just slightly more than the thickness of a single fastener F and less than the combined thickness of two of the fasteners glued together. The coplanar bottom faces of recesses 77 and 78 are exposed to the opening 64 in the back wall 63 of column 21. This back wall has a thickness slightly greater than the thickness of a single fastener F.

A driver in the form of a rigid thin flat plate 79 is rigidly attached by bolts B to the back of the vertically reciprocable member 68. This plate slidably engages the inside face of the back wall 63 of vertical column 21, as shown in FIG. 7, and its thickness is such that it can pass snugly but slidably down and up along the recesses 77 and 78 in guide plates 75 and 76, as shown in FIGS. 4 and 8.

A vertical post 80 is rigidly attached to column 21 at the latter's upper end and extends up from it. A horizontal cross piece 81 on the upper end of post 80 receives a pair of cushioned hand grips 82 and 83.

In operation, spring 73 normally pulls up the rigid assembly of driver 79, vertically reciprocable member 68, slide 66 and foot pedal 65 to the upwardly retracted position shown in FIG. 9. The spring-actuated follower P in the magazine assembly pushes the entire group of fasteners F to the left in FIG. 9. The leading fastener F abuts against the bottom of recesses 77 and 78 in guide plates 75 and 76, respectively, and it is completely past the front end of the magazine. The fastener immediately behind the leading one is positioned in the opening 64 in the back wall of column 21, substantially in the plane of that wall.

As shown in FIG. 14, the user can grasp the hand grips 82 and 83 and put one of his feet on top of foot pedal 65. When he pushes down on the foot pedal, the rigid assembly of the foot pedal 65, slide 66, vertically reciprocable member 68 and driver 79 moves down. The driver 79 engages the top of the leading fastener F, forcing it down along the guide plate recesses 77 and 78 and driving its tapered lower end 56 first into the ground, followed by the rest of the fastener. The downwardly moving driver severs the leading fastener F from its glued connection to the following one.

FIG. 11 shows the position of the parts at the completion of driving one fastener F into the ground through an erosion cover C on the ground.

The user now can remove his foot from the foot pedal or relax its downward pressure on the foot pedal, so that the return spring 73 can pull the foot pedal 65, slide 66, vertically reciprocable member 68 and driver 79 up in unison to the retracted, starting position shown in FIG. 9.

As shown in FIG. 14, the user can remain erect while operating the machine, which reduces fatigue. Also, in this standing position the user can move quickly and easily from one fastening position on the erosion cover to the next. Consequently, it is possible for the user in a given time period to fasten a large area of the erosion cover on the ground.

I claim:

1. A thin, flat, substantialy rigid fastener for holding erosion cloth on the ground comprising an elongated first vertical leg having an upper end and a tapered lower end, a second vertical leg extending parallel to said first vertical leg and having an upper end and a lower end, said second vertical leg being substantially shorter than said first vertical leg, and a horizontal top segment joined to and extending between said upper ends of said vertical legs, said vertical legs and said top segment having substantially flat, coplanar, opposite major faces, said vertical legs and said top segment forming an integral one-piece body of high impact plastic, said first vertical leg having an inside longitudinal edge extending between its major faces and facing toward said second leg and an outside longitudinal edge extending between its major faces away from said second leg, said second vertical leg having an inside longitudinal edge extending between its major faces and facing toward said first leg and an outside longitudinal edge extending between its major faces away from said first leg, said top segment having bottom and top edges extending between its major faces, said first and second vertical legs each being substantially thinner between its major faces than across the width of its major faces from its inside edge to its outside edge, said top segment being substantially thinner between its major faces than across the width of its major faces from its bottom edge to its top edge, said tapered lower end of said first vertical leg having its inside face downwardly and outwardly inclined for causing said first vertical leg to bend away from said second vertical leg when the fastener is driven into the ground.

2. A fastener according to claim 1, wherein said high impact plastic is polycarbonate.

3. A fastener according to claim 1, wherein said first vertical leg has a length several times that of said second vertical leg below said top segment.

4. A fastener according to claim 2, wherein said first vertical leg has a length several times that of said second vertical leg below said top segment.

* * * * *